US009430063B2

(12) United States Patent
Kim (10) Patent No.: US 9,430,063 B2
(45) Date of Patent: Aug. 30, 2016

(54) ELECTRONIC DEVICE, METHOD OF OPERATING THE SAME, AND COMPUTER-READABLE MEDIUM THAT STORES A PROGRAM

(71) Applicant: SAMSUNG DISPLAY CO., LTD., Yongin, Gyeonggi-Do (KR)

(72) Inventor: Mu-Gyeom Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 1 day.

(21) Appl. No.: 14/161,098

(22) Filed: Jan. 22, 2014

(65) Prior Publication Data

US 2014/0218319 A1 Aug. 7, 2014

(30) Foreign Application Priority Data

Feb. 6, 2013 (KR) .................. 10-2013-0013599

(51) Int. Cl.
*G06F 3/0354* (2013.01)
*G06F 1/16* (2006.01)
*G06F 3/0485* (2013.01)

(52) U.S. Cl.
CPC .......... *G06F 3/03547* (2013.01); *G06F 1/169* (2013.01); *G06F 1/1643* (2013.01); *G06F 3/0485* (2013.01)

(58) Field of Classification Search
CPC .......... G06F 3/03547; G06F 3/04883; G06F 1/1643; G06F 1/169; G06F 3/0485
See application file for complete search history.

(56) References Cited

U.S. PATENT DOCUMENTS

| 2008/0018583 | A1 | 1/2008 | Knapp et al. |
| 2010/0287470 | A1* | 11/2010 | Homma et al. ............... 715/702 |
| 2011/0090515 | A1* | 4/2011 | Hasenohr ..................... 356/614 |
| 2011/0187660 | A1* | 8/2011 | Hirata et al. .................. 345/173 |
| 2012/0011438 | A1* | 1/2012 | Kim ..................... G06F 1/1626 715/702 |

FOREIGN PATENT DOCUMENTS

| KR | 10-2007-0026529 | 3/2007 |
| KR | 10-2009-0005651 | 1/2009 |
| KR | 10-2012-0014319 | 2/2012 |

* cited by examiner

*Primary Examiner* — Andrew Sasinowski
(74) *Attorney, Agent, or Firm* — Lewis Roca Rothgerber Christie LLP (57) ABSTRACT

An electronic device includes a touch-screen unit having at least one pair of facing curved sides and a body unit to which the touch-screen unit is attached. A scroll speed is changed based on the touch-scroll operation performed at respective points of the touch-screen unit relative to the at least one pair of facing curved sides.

12 Claims, 11 Drawing Sheets

ELECTRONIC DEVICE, METHOD OF OPERATING THE SAME, AND COMPUTER-READABLE MEDIUM THAT STORES A PROGRAM

CROSS-REFERENCE TO RELATED APPLICATION

This application claims priority to and the benefit of Korean Patent Application No. 10-2013-0013599, filed on Feb. 6, 2013 in the Korean Intellectual Property Office (KIPO), the contents of which are incorporated herein in its entirety by reference.

BACKGROUND

1. Field

Example embodiments relate generally to an electronic device. More particularly, embodiments of the inventive concepts relate to an electronic device having a touch-screen unit, a method of operating the electronic device, and a computer-readable medium that stores a program.

2. Description of the Related Art

An electronic device having a touch-screen unit (e.g., a cellular phone, a smart-phone, a smart-pad, a laptop, a computer, a television, etc.) is widely used. Because a consumer puts importance on a design of an electronic device when purchasing the electronic device, many manufacturing companies continuously try to utilize a touch-screen unit having various suitable shapes to the electronic device. Thus, if an electronic device includes a touch-screen unit having curved sides, the electronic device provides a user with new user experiences that are different from comparable electronic devices that include a touch-screen unit having straight sides (e.g., a square-shape touch-screen unit, a rectangular-shape touch-screen unit).

SUMMARY

Aspects of example embodiments are directed toward an electronic device that includes a touch-screen unit having curved sides, where the electronic device provides a user with new user experiences different from comparable electronic devices that include a touch-screen unit having straight sides.

Aspects of example embodiments are directed toward a method of operating an electronic device.

Aspects of example embodiments are directed toward a computer-readable medium that stores a program, where the computer-readable medium is used in an electronic device that includes a touch-screen unit having curved sides, capable of providing a user with new user experiences different from comparable electronic devices that include a touch-screen unit having straight sides.

According to an aspect of the example embodiments, an electronic device may include: a body unit, and a touch-screen unit attached to the body unit and having at least one pair of facing curved sides, the touch-screen unit being configured to change a scroll speed in response to a touch-scroll operation performed on respective points of the touch-screen unit, and the scroll speed being based on the touch-scroll operation performed at the respective points relative to the at least one pair of facing curved sides.

The at least one pair of facing curved sides may include a left curved side and a right curved side of the touch-screen unit.

The at least one pair of facing curved sides may include an upper curved side and a lower curved side of the touch-screen unit.

The at least one pair of facing curved sides may include concave-shaped sides, the concave-shaped sides constituting a concave region of the touch-screen unit.

The concave region of the touch-screen unit may have a symmetrical shape with respect to a centerline of the touch-screen unit substantially perpendicular to the concave region.

The concave region of the touch-screen unit may have an asymmetric shape with respect to a centerline of the touch-screen unit substantially perpendicular to the concave region.

The scroll speed in a parallel direction to the at least one pair of facing curved sides of the touch-screen unit may increase when the touch-scroll operation is performed toward a center part of the concave region of the touch-screen unit.

The scroll speed in a cross direction to the at least one pair of facing curved sides of the touch-screen unit may decrease when the touch-scroll operation is performed toward a center part of the concave region of the touch-screen unit.

The at least one pair of facing curved sides may include convex-shaped sides, the convex-shaped sides constituting a convex region of the touch-screen unit.

The convex region of the touch-screen unit may have a symmetrical shape with respect to a centerline of the touch-screen unit substantially perpendicular to the convex region.

The convex region of the touch-screen unit may have an asymmetric shape with respect to a centerline of the touch-screen unit substantially perpendicular to the convex region.

The scroll speed in a parallel direction to the at least one pair of facing curved sides of the touch-screen unit may decrease when the touch-scroll operation is performed toward a center part of the convex region of the touch-screen unit.

The scroll speed in a cross direction to the at least one pair of facing curved sides of the touch-screen unit may increase when the touch-scroll operation is performed toward a center part of the convex region of the touch-screen unit.

According to another aspect of the example embodiments, a method of operating an electronic device is described, the method including: performing a touch-scroll operation on a touch-screen unit having at least one pair of facing curved sides in response to a user input; and changing a scroll speed based on a location of the touch-scroll operation performed relative to the at least one pair of facing curved sides.

The changing the scroll speed may include: increasing the scroll speed in a parallel direction to the at least one pair of facing curved sides of the touch-screen unit in response to the touch-scroll operation being performed toward a center part of the concave region of the touch-screen unit; and decreasing the scroll speed in a cross direction to the at least one pair of facing curved sides of the touch-screen unit in response to the touch-scroll operation being performed toward the center part of the concave region of the touch-screen unit.

The changing the scroll speed may include: decreasing the scroll speed in a parallel direction to the at least one pair of facing curved sides of the touch-screen unit in response to the touch-scroll operation being performed toward a center part of the convex region of the touch-screen unit; and increasing the scroll speed in a cross direction to the at least one pair of facing curved sides of the touch-screen unit in response to the touch-scroll operation being performed toward the center part of the convex region of the touch-screen unit.

According to another aspect of the example embodiments, a computer-readable medium storing a program is described, wherein the program may be configured to implement: a function for performing a touch-scroll operation on a touch-screen unit having at least one pair of facing curved sides in response to a user input at respective points of the touch-screen unit, and a function for changing a scroll speed based on the user input being performed at respective points relative to the at least one pair of facing curved sides.

Therefore, an electronic device, a method of operating an electronic device, and a computer-readable medium that stores a program according to various aspects of the example embodiments may provide a user with new user experiences (e.g., different speed-sensations depending on respective points of a touch-screen unit) different from comparable electronic devices that include a touch-screen unit having straight sides.

BRIEF DESCRIPTION OF THE DRAWINGS

Illustrative, non-limiting example embodiments will be more clearly understood from the following detailed description in conjunction with the accompanying drawings.

DETAILED DESCRIPTION

Various example embodiments will be described more fully hereinafter with reference to the accompanying drawings showing some of the example embodiments. The present inventive concepts may, however, be embodied in many different forms and should not be construed as being limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc., may be used herein to describe various elements, these elements are not limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments and is not intended to limit the present inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by a person having ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Expressions such as "at least one of," when preceeding a list of elements, modify the entire list of elements and do not modify the individual elements of the list. Further, the use of "may" when describing embodiments of the present invention refers to "one or more embodiments of the present invention."

Figure 1:
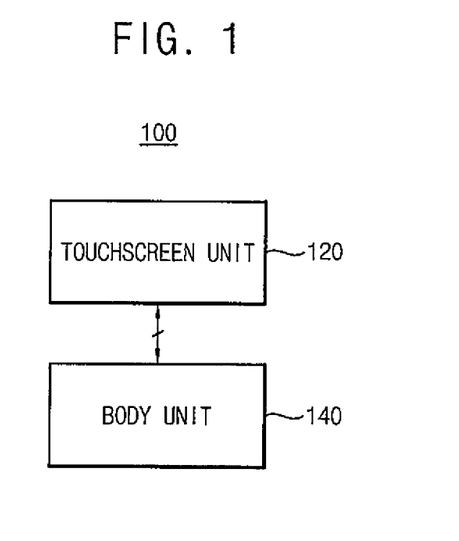
FIG. 1 is a block diagram illustrating an electronic device according to example embodiments.

FIG. 1 is a block diagram illustrating an electronic device according to example embodiments.

Referring to FIG. 1, the electronic device 100 may include a touch-screen unit 120 and a body unit 140 to which the touch-screen unit 120 is attached. Here; the touch-screen unit 120 may include a display device and a touch sensor device. For example, the electronic device 100 may be implemented as a cellular phone, a smart-phone, a smart-pad, etc. However, the kind of the electronic device 100 is not limited thereto.

The touch-screen unit 120 may have at least one pair of facing curved sides. In one example embodiment, the facing curved sides may be a left curved side and a right curved side. In another example embodiment, the facing curved sides may be an upper curved side and a lower curved side.

Thus, the touch-screen unit 120 may have the left curved side and the right curved side, may have the upper curved side and the lower curved side, or may have the left curved side, the right curved side, the upper curved side, and the lower curved side. As a result, a shape of the touch-screen unit 120 may be different from a shape of a comparable touch-screen unit having straight sides (e.g., a square-shape touch-screen unit, a rectangular-shape touch-screen unit). Here, a scroll speed of an image on the display may be changed (e.g., faster or slower scroll speed) based on the facing curved sides when a touch-scroll operation is performed on the touch-screen unit 120 of the electronic device 100. That is, when a touch-scroll operation is performed on the touch-screen unit 120 of the electronic device 100, the scroll speed may change depending on respective points of the touch-screen unit 120 (e.g., depending on whether a touch-scroll operation is performed at a concave region of the touch-screen unit 120 or at a convex region of the touch-screen unit 120). As a result, the electronic device 100 may provide a user with new user experiences that comparable electronic devices cannot implement because the electronic device 100 provides the user with different speed-sensations, depending on which respective points of the touch-screen unit 120, the touch-scroll operation is performed.

In the example embodiments, the facing curved sides of the touch-screen unit 120 correspond to concave-shape sides constituting a concave region of the touch-screen unit 120. In one example embodiment, the concave region of the touch-screen unit 120 has a symmetrical shape with respect to a centerline of the touch-screen unit 120. In this case, a centerline passing through a center part of the concave region of the touch-screen unit 120 may be collinear with a centerline of the touch-screen unit 120. In another example embodiment, the concave region of the touch-screen unit 120 has an asymmetric shape with respect to the centerline of the touch-screen unit 120. In this case, a centerline passing through the center part of the concave region of the touch-screen unit 120 may not be collinear with a centerline passing through the center part of the touch-screen unit 120. Meanwhile, a touch-scroll operation may be performed in a parallel direction to sides (e.g., a direction parallel with respect to the sides) of the touch-screen unit 120. In this case, the scroll speed in the parallel direction to the sides of the touch-screen unit 120 may become faster as it gets closer to a center part of the concave region of the touch-screen unit 120. In addition, a touch-scroll operation may be performed in a cross direction to sides (e.g., a direction crossing the sides in a substantially perpendicular direction with respect to the sides) of the touch-screen unit 120 on the touch-screen unit 120. In this case, the scroll speed in the cross direction to the sides of the touch-screen unit 120 may be slower as it gets closer to the center part of the concave region of the touch-screen unit 120. These operations will be described in more detail with reference to FIGS. 2A and 3A.

In the example embodiments, the facing curved sides of the touch-screen unit 120 correspond to convex-shaped sides constituting a convex region of the touch-screen unit 120. In one example embodiment, the convex region of the touch-screen unit 120 has a symmetrical shape with respect to the centerline of the touch-screen unit 120. In this case, the centerline passing through the center part of the convex region of the touch-screen unit 120 may be collinear with the centerline of the touch-screen unit 120. In another example embodiment, the convex region of the touch-screen unit 120 has an asymmetric shape with respect to the centerline of the touch-screen unit 120. In this case, the centerline passing through the center part of the convex region of the touch-screen unit 120 may not be collinear with the centerline of the touch-screen unit 120. Also, a touch-scroll operation may be performed in a parallel direction to the sides of the touch-screen unit 120 on the touch-screen unit 120. In this case, the scroll speed in the parallel direction to the sides of the touch-screen unit 120 may be slower as it gets closer to the center part of the convex region of the touch-screen unit 120. In addition, the touch-scroll operation may be performed in the cross direction to the sides of the touch-screen unit 120 on the touch-screen unit 120. In this case, the scroll speed in the cross direction to the sides of the touch-screen unit 120 become faster as it gets closer to the center part of the convex region of the touch-screen unit 120. These operations will be described in detail with reference to FIGS. 2B and 3B.

As described above, the touch-screen unit 120 may be attached to the body unit 140. Because the touch-screen unit 120 includes the display device and the touch sensor device, the body unit 140 may include at least one controller (e.g., a display controller and a touch sensor controller). Here, the controller may control a display function and a touch sensor function of the touch-screen unit 120. In addition, the body unit 140 may include an application processor and a plurality of sensors. The application processor may perform various computing functions to control overall operations of the electronic device 100. For example, the application processor may be a micro-processor, a central processing unit (CPU), etc. The sensors may perform various sensing operations of the electronic device 100. For example, the sensors may include a gyro sensor that measures rotating angular speed, an acceleration sensor that measures speed and momentum, a geomagnetic field sensor that acts as a compass, a barometer sensor that measures altitude, a grip sensor that determines whether a mobile device is gripped by a user, a gesture-proximity-illumination sensor that performs various operations such as motion recognition, proximity detection, illumination measurement, etc., and a temperature-humidity sensor that measures temperature and humidity. However, the kind of the sensors is not limited thereto.

In addition, the body unit 140 may further include a memory device, a storage device, a plurality of functional devices, etc. The memory device may store data for operations of the electronic device 100. For example, the memory device may include a volatile semiconductor memory device such as a dynamic random access memory (DRAM) device, a static random access memory (SRAM) device, a mobile DRAM device, etc., and/or a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. The storage device may include a solid state drive (SSD) device, a hard disk drive (HDD) device, a CD-ROM device, etc. The functional devices may perform various operations of the electronic device 100. For example, the functional devices may include a camera device that performs a camera function (e.g., photographing, videographing), a communication device that performs a communication function (e.g., code division multiple access (COMA) module, long term evolution (LTE) module, radio frequency (RF) module, ultra wideband (UWB) module, wireless local area network (WLAN) module, worldwide interoperability for microwave access (WIMAX) module, etc.), a global positioning system (GPS) device, a microphone (MIC) device, a speaker device, etc. However, the kind of the functional devices included in the electronic device 100 is not limited thereto.

As described above, the electronic device 100 may provide a user with new user experiences (e.g., different speed-sensations depending on respective points of the touch-screen unit 120) different from comparable electronic devices that include a touch-screen unit having straight sides by changing the scroll speed (e.g., the scroll speed in a parallel direction to the sides of the touch-screen unit 120 and the scroll speed in a cross direction to the sides of the touch-screen unit 120) based on the facing curved sides of the touch-screen unit 120 when the touch-scroll operation is performed on the touch-screen unit 120. As a result, when the touch-scroll operation is performed on the touch-screen unit 120 of the electronic device 100 such as a smart-phone, a computer, etc., a user may experience speed-sensations associated a design (e.g., shape) of the touch-screen unit 120 of the electronic device 100.

Figure 2A:
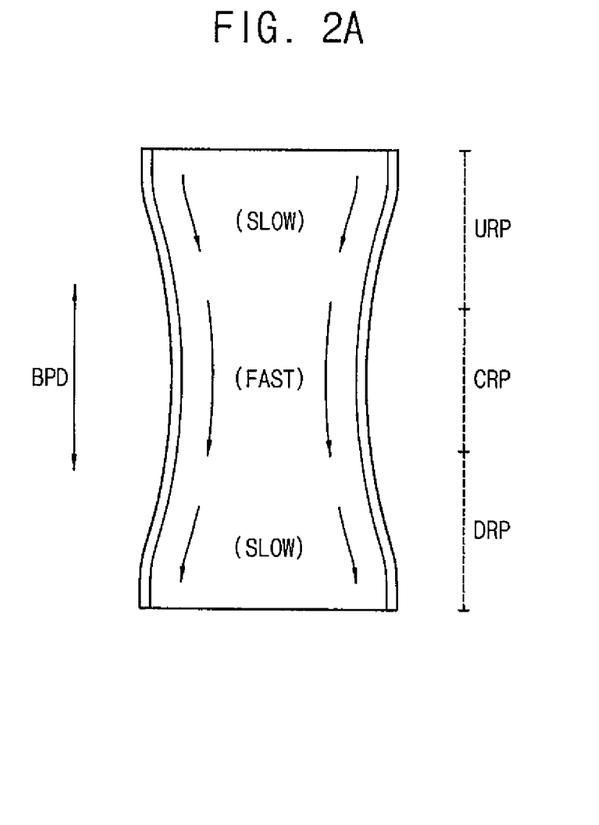
FIGS. 2A and 2B are diagrams illustrating examples in which a scroll speed in a parallel direction to sides is changed based on facing curved sides in the electronic device of FIG. 1.
Figure 2B:
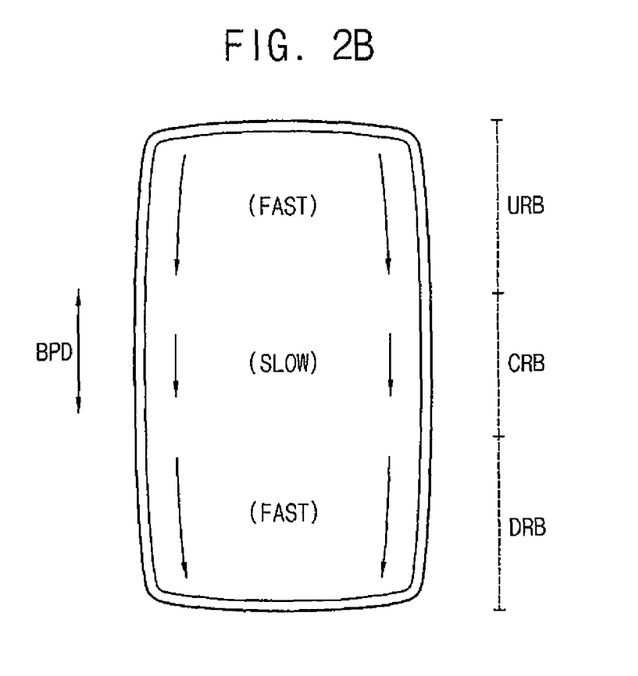

FIGS. 2A and 2B are diagrams illustrating example embodiments in which a scroll speed in a parallel direction to the sides (e.g., left and right sides shown in FIGS. 2A and 2B) is changed based on the facing (opposing) curved sides in the electronic device of FIG. 1.

FIGS. 2A and 2B illustrate that the touch-scroll operation is performed in a parallel direction BPD to the sides on the touch-screen unit 120. FIG. 2A shows a scroll speed in a parallel direction BPD to the sides at the concave region of the touch-screen unit 120. FIG. 2B shows a scroll speed in a parallel direction BPD to the sides at the convex region of the touch-screen unit 120. For convenience of description, it is illustrated in FIGS. 2A and 2B that at least one pair of the facing curved sides of the touch-screen unit 120 includes a left curved side and a right curved side.

According to an embodiment, when a touch-scroll operation is performed in a parallel direction BPD to the sides of the touch-screen unit 120, the scroll speed in a parallel direction BPD to the sides become faster as it gets closer to a center part CRP of the concave region of the touch-screen unit 120. For example, as illustrated in FIG. 2A, the touch-scroll operation is performed from an upper region (e.g., top) to a lower region (e.g., bottom) of the touch-screen unit 120. In this case, the scroll speed in a parallel direction BPD to the sides may be relatively slower at a peripheral part URP of the concave region of the touch-screen unit 120 (indicated as "SLOW"), the scroll speed in a parallel direction BPD to the sides is relatively faster at a center part CRP of the concave region of the touch-screen unit 120 (indicated as "FAST"), and the scroll speed in a parallel direction BPD to the sides is relatively slower at a peripheral part DRP of the concave region of the touch-screen unit 120 (indicated as "SLOW"). According to another embodiment, when the touch-scroll operation is performed in a parallel direction BPD to the sides on the touch-screen unit 120, the scroll speed in a parallel direction BPD to the sides become slower as it gets closer to a center part CRB of the convex region of the touch-screen unit 120. For example, as illustrated in FIG. 2B, the touch-scroll operation may be performed from an upper region (e.g., top) to a lower region (e.g., bottom) of the touch-screen unit 120. In this case, a scroll speed in a parallel direction BPD to the sides is relatively faster at a peripheral part URB of the convex region of the touch-screen unit 120 (indicated as "FAST"), a scroll speed in a parallel direction BPD to the sides is relatively slower at a center part CRB of the convex region of the touch-screen unit 120 (indicated as "SLOW"), and a scroll speed in a parallel direction BPD to the sides may be relatively faster at a peripheral part DRB of the convex region of the touch-screen unit 120 (e.g., indicated as "FAST").

As described above, the electronic device 100 of FIG. 1 may provide a user with new user experiences (e.g., different speed-sensations depending on respective points of the touch-screen unit 120) different from comparable electronic devices that include a touch-screen unit having straight sides. For example, the electronic device 100 of FIG. 1 may implement an effect of Bernoulli's principle by increasing the scroll speed (e.g., a flow velocity) at a center part CRP of the concave region of the touch-screen unit 120. In addition, the electronic device 100 of FIG. 1 may implement an effect of a concave mirror by quickly moving an image at the center part CRP of the concave region of the touch-screen unit 120. On the other hand, the electronic device 100 of FIG. 1 may implement an effect of a convex mirror by slowly moving an image at the center part CRB of the convex region of the touch-screen unit 120. Because these user experiences are described as example embodiments, the user experiences implemented by changing the scroll speed in a parallel direction BPD to the sides based on the facing curved sides of the touch-screen unit 120 are not limited thereto.

Figure 3A:
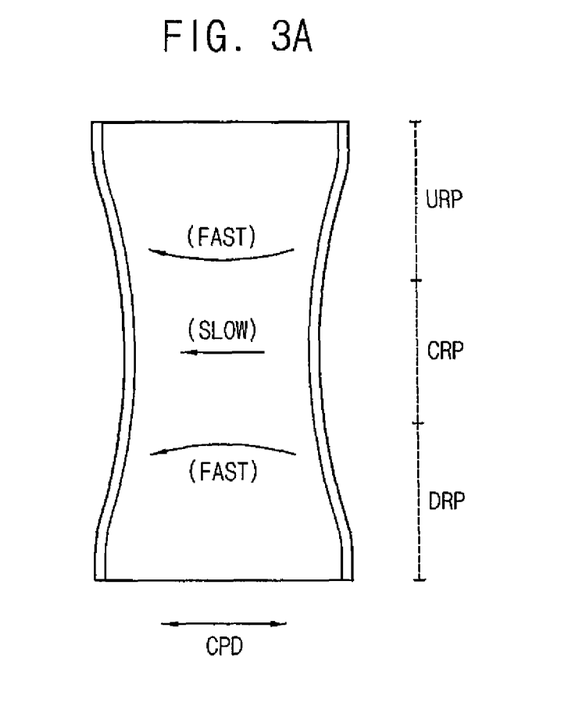
FIGS. 3A and 3B are diagrams illustrating examples in which the scroll speed in a cross direction to sides is changed based on the facing curved sides in the electronic device of FIG. 1.
Figure 3B:
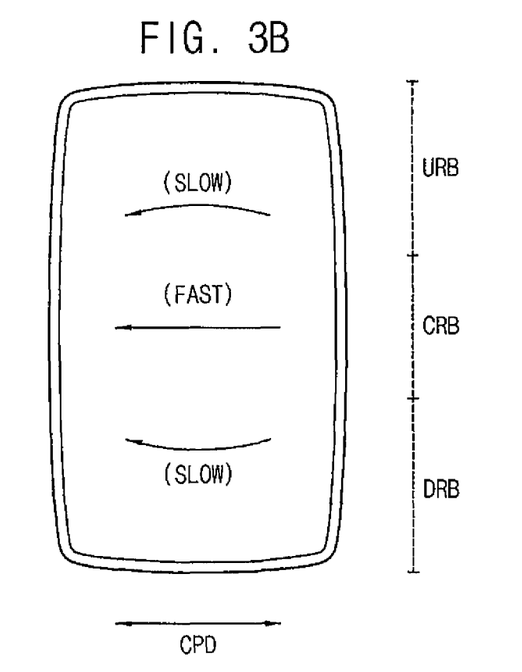

FIGS. 3A and 3B are diagrams illustrating examples in which a scroll speed in a cross direction to the sides is changed based on facing curved sides in the electronic device of FIG. 1.

Referring to FIGS. 3A and 3B, it is illustrated in FIGS. 3A and 3B that the touch-scroll operation is performed in a cross direction CPD to the sides on the touch-screen unit 120. FIG. 3A shows a scroll speed in the cross direction CPD to the sides at the concave region of the touch-screen unit 120. FIG. 3B shows a scroll speed in the cross direction CPD to the sides at the convex region of the touch-screen unit 120. For convenience of description, it is illustrated in FIGS. 3A and 3B that at least one pair of facing curved sides of the touch-screen unit 120 includes a left curved side and a right curved side.

Specifically, when the touch-scroll operation is performed in the cross direction CPD to the sides on the touch-screen unit 120, the scroll speed in the cross direction CPD to the sides become slower as it gets closer to the center part CRP of the concave region of the touch-screen unit 120. For example, as illustrated in FIG. 3A, the touch-scroll operation may be performed from a right region to a left region on the touch-screen unit 120. In this case, the scroll speed in the cross direction CPD to the sides may be relatively faster at peripheral parts URP and DRP of the concave region of the touch-screen unit 120 (indicated as FAST), and a scroll speed in the cross direction CPD to the sides may be relatively slower at the center part CRP of the concave region of the touch-screen unit 120 (indicated as SLOW). In some embodiments, when the touch-scroll operation is performed in the cross direction CPD to the sides on the touch-screen unit 120, a scroll speed in the cross direction CPD to the sides become faster as it gets closer to the center part CRB of the convex region of the touch-screen unit 120. For example, as illustrated in FIG. 3B, the touch-scroll operation may be performed from the right region to the left region on the touch-screen unit 120. In this case, the scroll speed in the cross direction CPD to the sides may be relatively slow at peripheral parts URB and DRB of the convex region of the touch-screen unit 120 (indicated as SLOW), and the scroll speed in the cross direction CPD to the sides may be relatively fast at the center part CRB of the convex region of the touch-screen unit 120 (indicated as FAST).

As described above, the electronic device 100 of FIG. 1 may provide a user with new user experiences (e.g., different speed-sensations depending on respective points of the touch-screen unit 120) different from comparable electronic devices that include the touch-screen unit having straight sides. For example, when the touch-scroll operation is performed from the right region to the left region (or from the left region to the right region) on the touch-screen unit 120, the scroll speed in the cross direction CPD to the sides may be relatively slower because a distance is relatively shorter at the center part CRP of the concave region of the touch-screen unit 120, and the scroll speed in the cross direction CPD to the sides may be relatively faster because the distance is relatively longer at the peripheral parts URP and DRP of the concave region of the touch-screen unit 120. On the other hand, when the touch-scroll operation is performed from the right region to the left region (or from the left region to the right region) on the touch-screen unit 120, the scroll speed in the cross direction CPD to sides may be relatively faster because the distance is relatively longer at the center part CRB of the convex region of the touch-screen unit 120, and the scroll speed in the cross direction CPD to the sides may be relatively slower because the distance is relatively shorter at the peripheral parts URB and DRB of the convex region of the touch-screen unit 120. Because these user experiences are examples, the user experiences implemented by changing the scroll speed in the cross direction CPD to the sides based on the facing curved sides of the touch-screen unit 120 are not limited thereto.

Figure 4A:
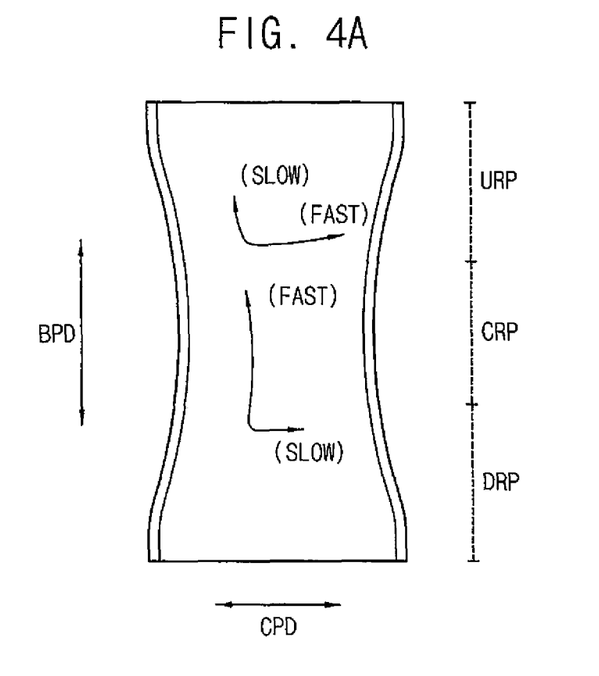
FIGS. 4A and 4B are diagrams illustrating examples in which the scroll speed in a parallel direction to the sides and a scroll speed in a cross direction to the sides are changed based on facing curved sides in an electronic device of FIG. 1.
Figure 4B:
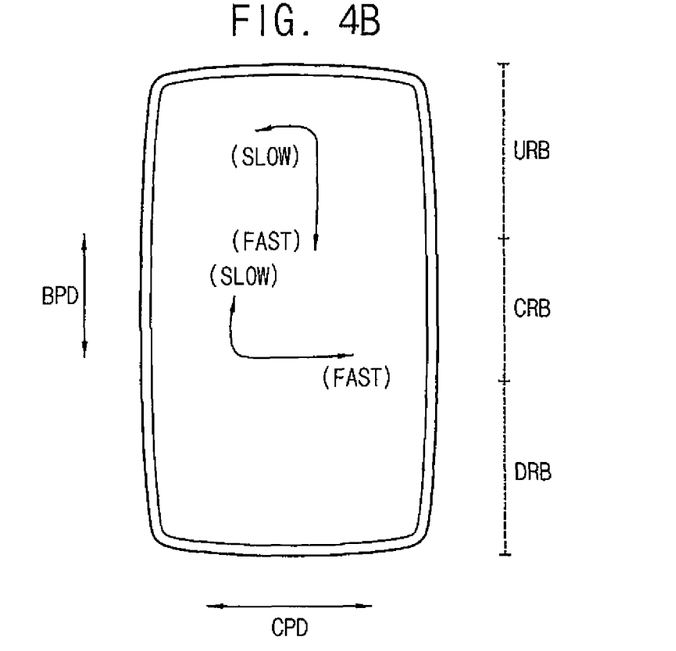

FIGS. 4A and 4B are diagrams illustrating examples in which the scroll speed in the parallel direction to the sides and the scroll speed in the cross direction to the sides are changed based on facing curved sides in the electronic device of FIG. 1.

Referring to FIGS. 4A and 4B, it is illustrated in FIGS. 4A and 4B that a touch-scroll operation is performed in both the parallel direction BPD to the side and the cross direction CPD to the sides on the touch-screen unit 120. FIG. 4A shows the scroll speed in the parallel direction BPD to the sides and the scroll speed in the cross direction CPD to the sides at the concave region of the touch-screen unit 120. FIG. 4B shows the scroll speed in the parallel direction BPD to the sides and the scroll speed in the cross direction CPD to the sides at the convex region of the touch-screen unit 120. For convenience of description, it is illustrated in FIGS. 4A and 4B that at least one pair of facing curved sides of the touch-screen unit 120 includes a left curved side and a right curved side.

According to an embodiment, as illustrated in FIG. 4A, when the touch-scroll operation is performed in both the parallel direction BPD to the sides and the cross direction CPD to the sides on the touch-screen unit 120, a scroll speed in the parallel direction BPD to the sides is faster as it gets closer to the center part CRP of the concave region of the touch-screen unit 120, and the scroll speed in the cross direction CPD to sides is slower as it gets closer to the center part CRP of the concave region of the touch-screen unit 120. That is, the scroll speed in the parallel direction BPD to the sides is slower as it gets closer to peripheral parts URP and DRP of the concave region of the touch-screen unit 120, and the scroll speed in the cross direction CPD to the sides is faster as it gets closer to peripheral parts URP and DRP of the concave region of the touch-screen unit 120. On the other hand, as illustrated in FIG. 4B, when the touch-scroll operation is performed in both the parallel direction BPD to the sides and the cross direction CPD to the sides on the touch-screen unit 120, the scroll speed in the parallel direction BPD to the sides is slower as it gets closer to the center part CRB of the convex region of the touch-screen unit 120, and the scroll speed in the cross direction CPD to the sides is faster as it gets closer to the center part CRB of the convex region of the touch-screen unit 120. That is, the scroll speed in the parallel direction BPD to the sides is faster as it gets closer to peripheral parts URB and DRB of the convex region of the touch-screen unit 120, and the scroll speed in the cross direction CPD to the sides is slower as it gets closer to peripheral parts URB and DRB of the convex region of the touch-screen unit 120. When the touch-scroll operation is performed in both the parallel direction BPD to the sides and the cross direction CPD to the sides on the touch-screen unit 120, the scroll speed in the parallel direction BPD to the sides (e.g., up-down scroll speed in FIGS. 4A and 4B) and the scroll speed in the cross direction CPD to the sides (e.g., left-right scroll speed in FIGS. 4A and 4B) are indicated as vectors (e.g., indicated as SLOW and FAST) in two-dimensional domain.

FIGS. 5A through 5H are diagrams illustrating examples in which the electronic device of FIG. 1 includes the touch-screen unit having the symmetrical shape.

Referring to FIGS. 5A through 5H, various symmetrical shapes of the touch-screen unit 120 included in the electronic device 100 of FIG. 1 are shown. However, symmetrical shapes of the touch-screen unit 120 included in the electronic device 100 of FIG. 1 are not limited thereto.

Figure 5A:
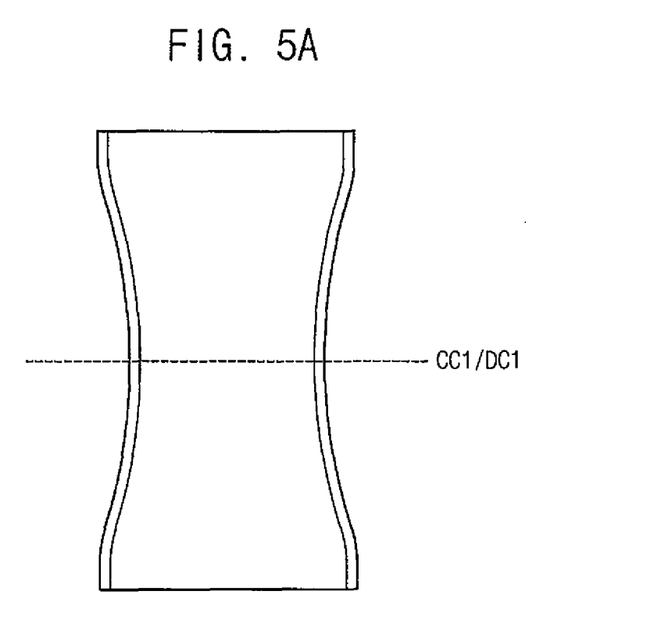
FIGS. 5A through 5H are diagrams illustrating examples in which the electronic device of FIG. 1 includes a touch-screen unit having a symmetrical shape.
Figure 5B:
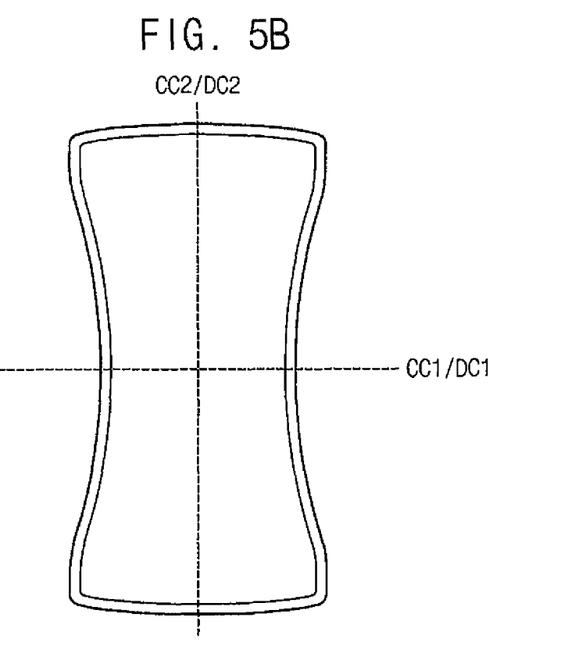

Specifically, the touch-screen unit 120 included in the electronic device 100 of FIG. 1 may have at least one pair of facing curved sides. In one example embodiment, the facing curved sides may be a left curved side and a right curved side. In another example embodiment, the facing curved sides may be an upper curved side and a lower curved side. Thus, the touch-screen unit 120 may have the left curved side and the right curved side, may have the upper curved side and the lower curved side, or may have the left curved side, the right curved side, the upper curved side, and the lower curved side. As illustrated in FIG. 5A, the touch-screen unit 120 may have the left curved side and the right curved side. Here, the left curved side and the right curved side may be concave-shape sides constituting a concave region of the touch-screen unit 120. Because the concave region of the touch-screen unit 120 has a symmetrical shape with respect to a centerline of the touch-screen unit 120, a centerline passing through the center part of the concave region of the touch-screen unit 120 may be collinear with the centerline of the touch-screen unit 120 (indicated as CC1 and DC1). As illustrated in FIG. 5B, the touch-screen unit 120 may have the left curved side, the right curved side, the upper curved side, and the lower curved side. Here, the left curved side and the right curved side may be concave-shaped sides constituting a concave region of the touch-screen unit 120, and the upper curved side and the lower curved side may be convex-shaped sides constituting a convex region of the touch-screen unit 120. Because the concave region of the touch-screen unit 120 has a symmetrical shape with respect to the centerline of the touch-screen unit 120, the centerline passing through the center part of the concave region of the touch-screen unit 120 may be collinear with the centerline of the touch-screen unit 120 (indicated as CC1 and DC1), and the centerline passing through the center part of the convex region of the touch-screen unit 120 may be collinear with the centerline of the touch-screen unit 120 (indicated as CC2 and DC2).

Figure 5C:
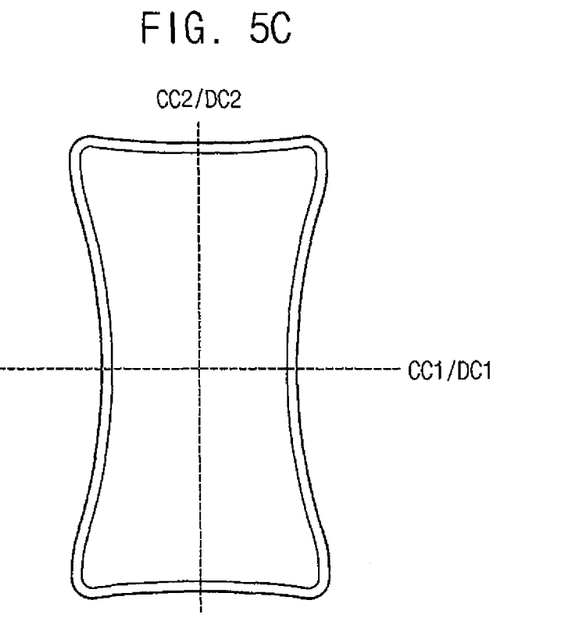
Figure 5D:
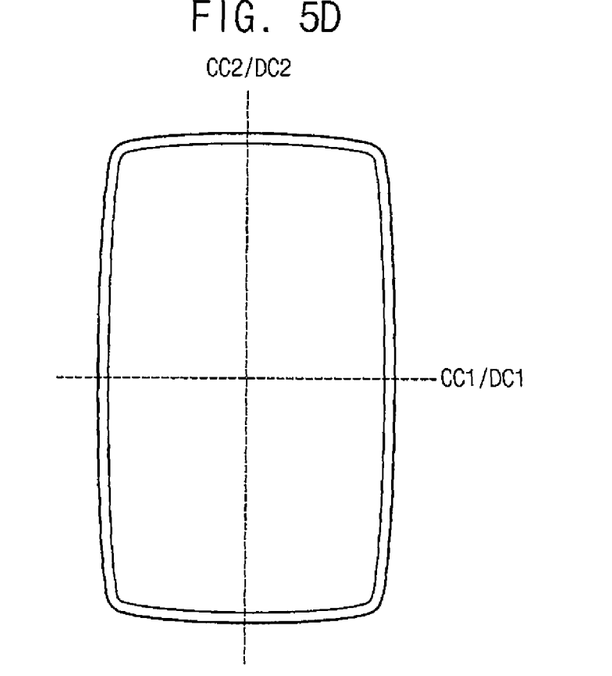
Figure 5E:
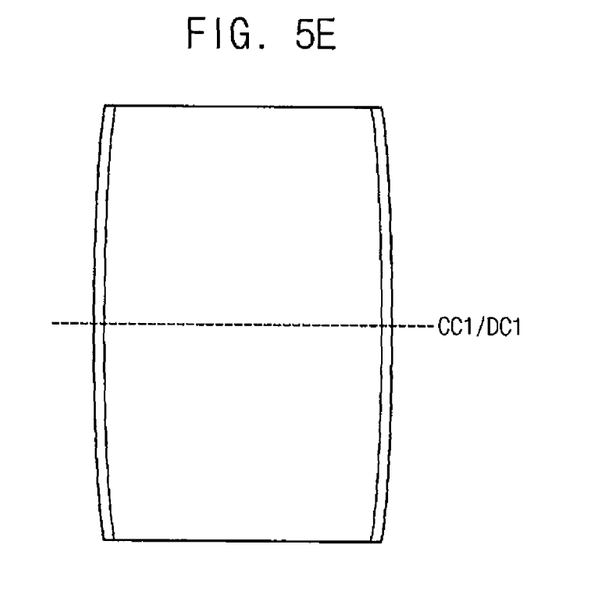

As illustrated in FIG. 5C, the touch-screen unit 120 may have the left curved side, the right curved side, the upper curved side, and the lower curved side. Here, the left curved side and the right curved side may be concave-shaped sides constituting a concave region of the touch-screen unit 120, and the upper curved side and the lower curved side may also be concave-shaped sides constituting the concave region of the touch-screen unit 120. Because the concave region of the touch-screen unit 120 has a symmetrical shape with respect to the centerline of the touch-screen unit 120, the centerline passing through the center part of the concave region of the touch-screen unit 120 may be collinear with the centerline of the touch-screen unit 120 (indicated as CC1, DC1, CC2, and DC2). As illustrated in FIG. 5D, the touch-screen unit 120 may have the left curved side, the right curved side, the upper curved side, and the lower curved side. Here, the left curved side and the right curved side may be convex-shape sides constituting a convex region of the touch-screen unit 120, and the upper curved side and the lower curved side may also be convex-shape sides constituting a convex region of the touch-screen unit 120. Because the convex region of the touch-screen unit 120 has a symmetrical shape with respect to the centerline of the touch-screen unit 120, the centerline passing through the center part of the convex region of the touch-screen unit 120 may be collinear with the centerline of the touch-screen unit 120 (indicated as CC1, DC1, CC2, and DC2). As illustrated in FIG. 5E, the touch-screen unit 120 may have the left curved side and the right curved side. Here, the left curved side and the right curved side may be convex-shape sides constituting a convex region of the touch-screen unit 120. Because the convex region of the touch-screen unit 120 has a symmetrical shape with respect to the centerline of the touch-screen unit 120, the centerline passing through the center part of the convex region of the touch-screen unit 120 may be collinear with the centerline of the touch-screen unit 120 (indicated as CC1 and DC1).

Figure 5F:
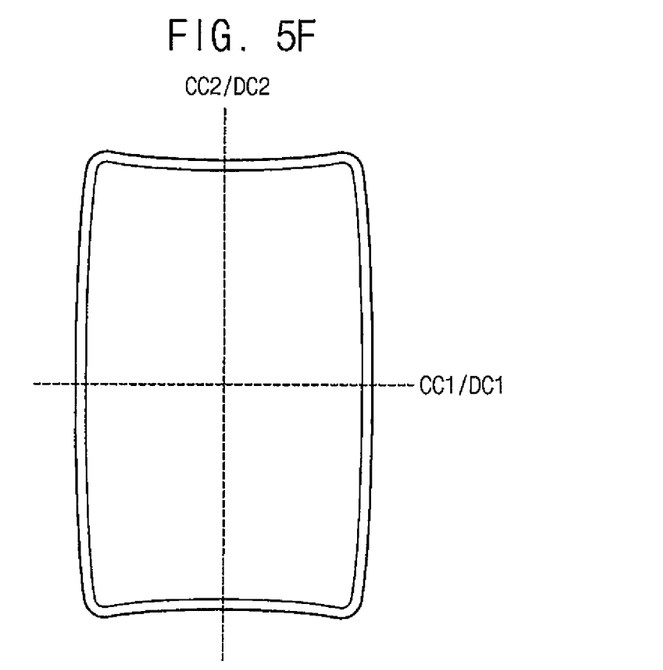
Figure 5G:
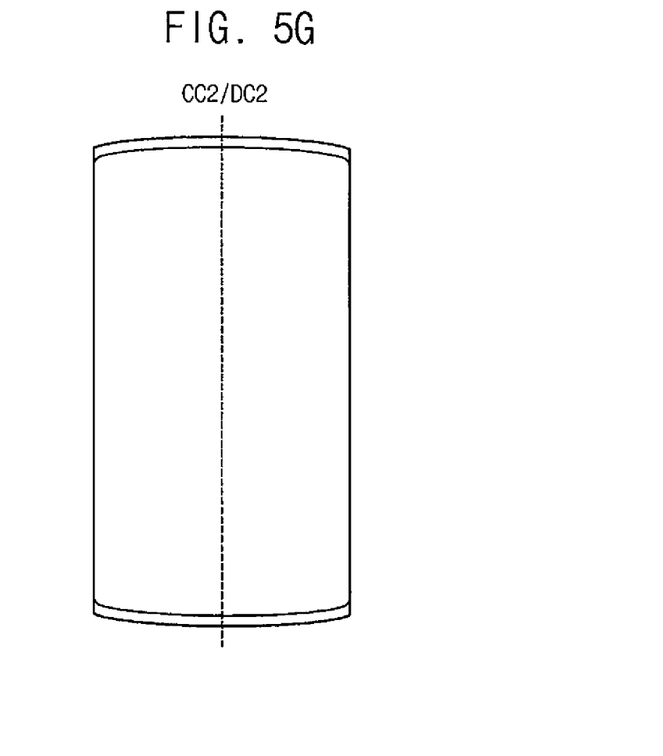
Figure 5H:
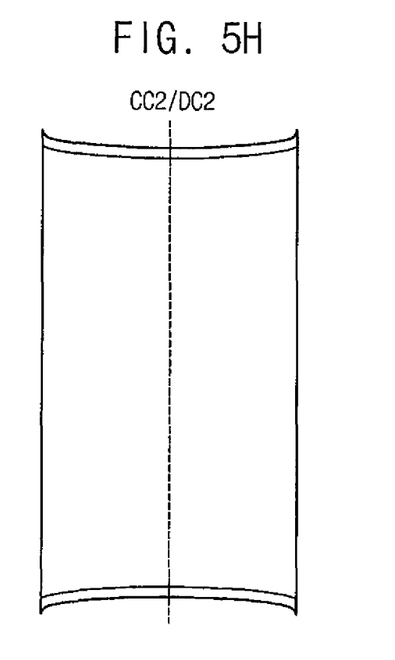

As illustrated in FIG. 5F, the touch-screen unit 120 may have the left curved side, the right curved side, the upper curved side, and the lower curved side. Here, the left curved side and the right curved side may be convex-shape sides constituting a convex region of the touch-screen unit 120, and the upper curved side and the lower curved side may be concave-shape sides constituting a concave region of the touch-screen unit 120. Because the convex region and the concave region of the touch-screen unit 120 have a symmetrical shape with respect to the centerline of the touch-screen unit 120, the centerline passing through the center part of the convex region of the touch-screen unit 120 may be collinear with the centerline of the touch-screen unit 120 (indicated as CC1 and DC1), and the centerline passing through the center part of the concave region of the touch-screen unit 120 may be collinear with the centerline of the touch-screen unit 120 (indicated as CC2 and DC2). As illustrated in FIG. 5G, the touch-screen unit 120 may have the upper curved side and the lower curved side. Here, the upper curved side and the lower curved side may be convex-shape sides constituting a convex region of the touch-screen unit 120. Because the convex region of the touch-screen unit 120 has a symmetrical shape with respect to the centerline of the touch-screen unit 120, the centerline passing through the center part of the convex region of the touch-screen unit 120 may be collinear with the centerline of the touch-screen unit 120 (indicated as CC2 and DC2). As illustrated in FIG. 5H, the touch-screen unit 120 may have the upper curved side and the lower curved side. Here, the upper curved side and the lower curved side may be concave-shape sides constituting a concave region of the touch-screen unit 120. Because the concave region of the touch-screen unit 120 has a symmetrical shape with respect to the centerline of the touch-screen unit 120, the centerline passing through the center part of the concave region of the touch-screen unit 120 may be collinear with the centerline of the touch-screen unit 120 (indicated as CC2 and DC2).

Figure 6A:
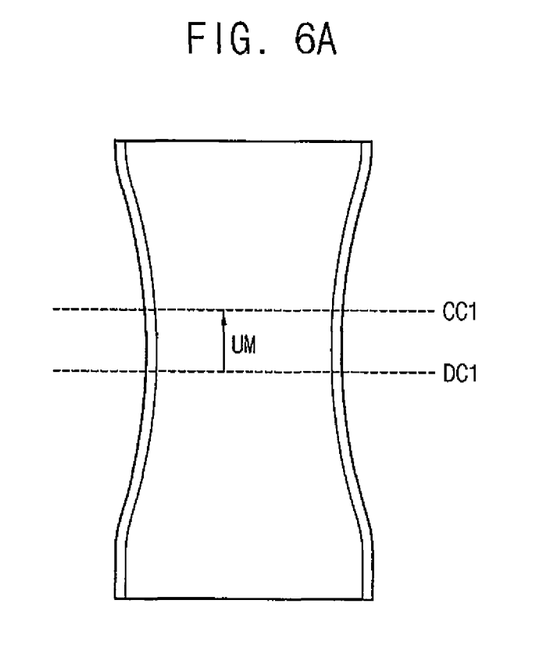
FIGS. 6A and 6B are diagrams illustrating examples in which the electronic device of FIG. 1 includes a touch-screen unit having an asymmetric shape.
Figure 6B:
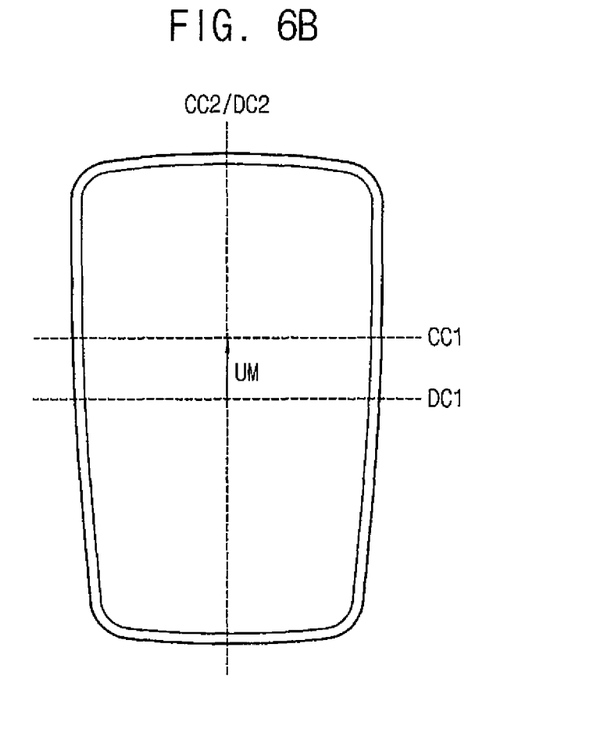

FIGS. 6A and 6B are diagrams illustrating examples in which the electronic device of FIG. 1 includes a touch-screen unit having an asymmetric shape.

Referring to FIGS. 6A and 6B, various asymmetric shapes of the touch-screen unit 120 included in the electronic device 100 of FIG. 1 are shown. However, asymmetric shapes of the touch-screen unit 120 included in the electronic device 100 of FIG. 1 are not limited thereto.

Specifically, the touch-screen unit 120 included in the electronic device 100 of FIG. 1 may have at least one pair of facing curved sides. In one example embodiment, the facing curved sides may be a left curved side and a right curved side. In another example embodiment, the facing curved sides may be an upper curved side and a lower curved side. Thus, the touch-screen unit 120 may have the left curved side and the right curved side, may have the upper curved side and the lower curved side, or may have the left curved side, the right curved side, the upper curved side, and the lower curved side. As illustrated in FIG. 6A, the touch-screen unit 120 may have the left curved side and the right curved side. Here, the left curved side and the right curved side may be concave-shape sides constituting a concave region of the touch-screen unit 120. Because the concave region of the touch-screen unit 120 has an asymmetric shape with respect to the centerline of the touch-screen unit 120, the centerline passing through the center part of the concave region of the touch-screen unit 120 may be spaced from the centerline of the touch-screen unit 120 by some distance UM (indicated as CC1 and DC1). That is, the centerline passing through the center of the concave region of the touch-screen unit 120 does not overlap the centerline of the touch-screen unit 120. As illustrated in FIG. 6B, the touch-screen unit 120 may have the left curved side, the right curved side, the upper curved side, and the lower curved side. Here, the left curved side and the right curved side may be convex-shape sides constituting the convex region of the touch-screen unit 120, and the upper curved side and the lower curved side may also be convex-shape sides constituting the convex region of the touch-screen unit 120. Because the convex region of the touch-screen unit 120 formed by the left curved side and the right curved side has an asymmetric shape with respect to the centerline of the touch-screen unit 120, the centerline passing through the center part of the convex region of the touch-screen unit 120 may be spaced from the centerline of the touch-screen unit 120 by some distance UM (indicated as CC1 and DC1). That is, the centerline passing through the center of the convex region of the touch-screen unit 120 does not overlap the centerline of the touch-screen unit 120. On the other hand, because the convex region of the touch-screen unit 120 formed by the upper curved side and the lower curved side has a symmetrical shape with respect to the centerline of the touch-screen unit 120, the centerline passing through the center part of the convex region of the touch-screen unit 120 may be collinear with the centerline of the touch-screen unit 120 (indicated as CC2 and DC2).

Figure 7:
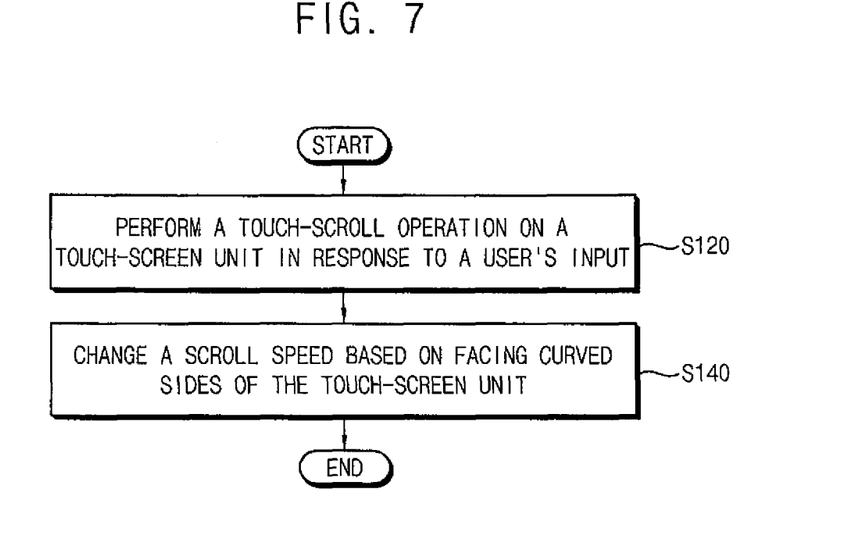
FIG. 7 is a flow chart illustrating a method of operating the electric device according to example embodiments.
Figure 8:
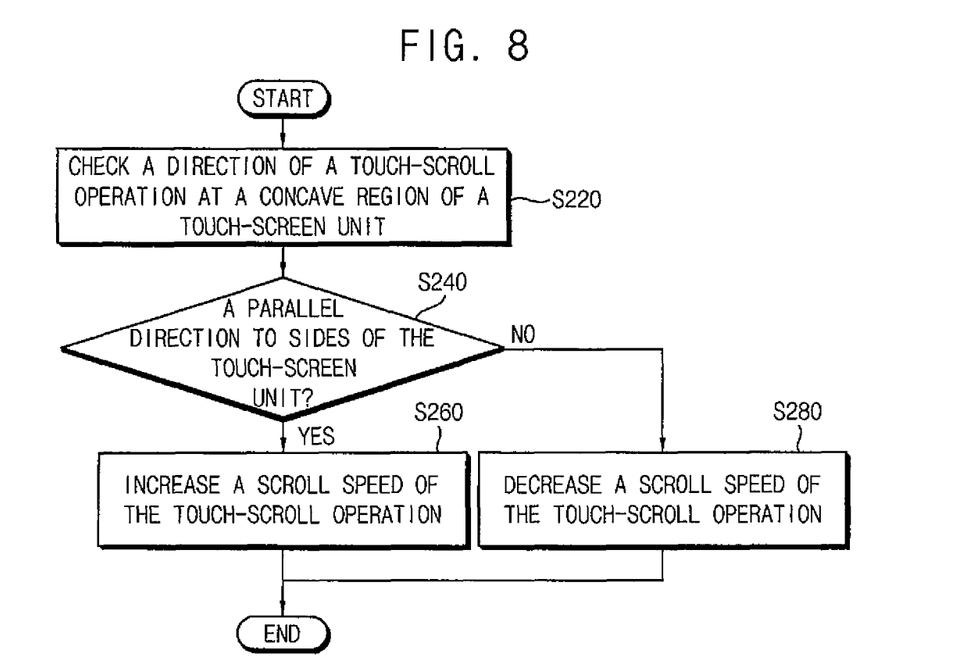
FIG. 8 is a flow chart illustrating an example in which the scroll speed is changed at a concave region of the touch-screen unit by the method of FIG. 7.
Figure 9:
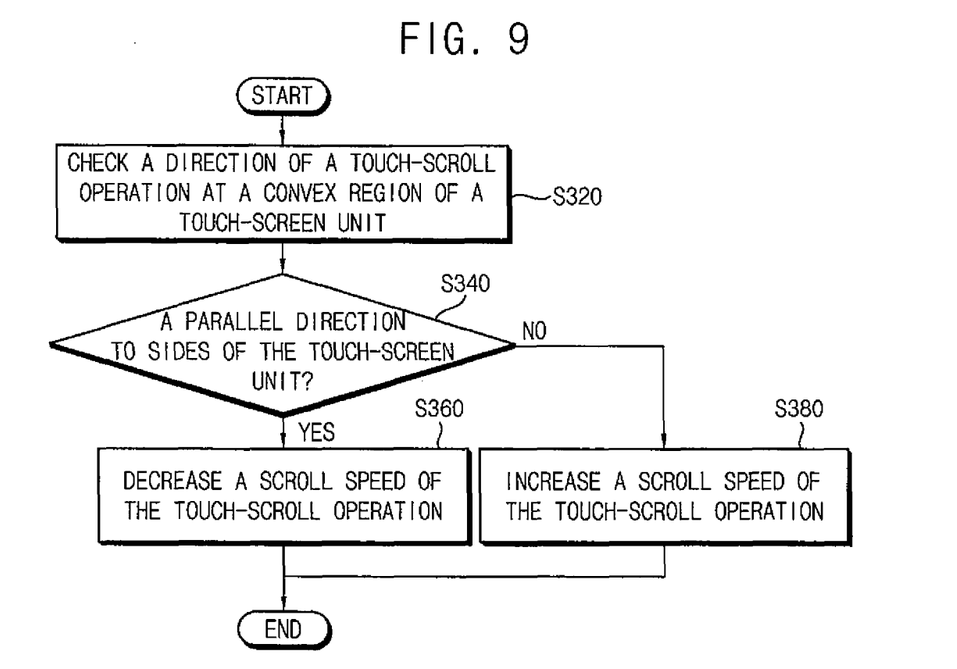
FIG. 9 is a flow chart illustrating an example in which the scroll speed is changed at a convex region of the touch-screen unit by the method of FIG. 7.

FIG. 7 is a flow chart illustrating a method of operating the electric device according to example embodiments. FIG. 8 is a flow chart illustrating an example in which the scroll speed is changed at a concave region of a touch-screen unit by the method of FIG. 7. FIG. 9 is a flow chart illustrating an example in which the scroll speed is changed at a convex region of the touch-screen unit by the method of FIG. 7.

The method as described in FIG. 7 may perform the touch-scroll operation on the touch-screen unit having at least one pair of facing curved sides in response to a user's input (Step S120), and may change the scroll speed based on the facing curved sides of the touch-screen unit (Step S140). According to one example embodiment, the facing curved sides of the touch-screen unit may correspond to concave-shape sides constituting the concave region of the touch-screen unit. In this case, when the scroll speed at the concave region of the touch-screen unit changes according to the method of FIG. 7, the scroll speed in the parallel direction to the sides become faster as it gets closer to the center part of the concave region of the touch-screen unit, and the scroll speed in the cross direction to the sides to become slower as it gets closer to the center part of the concave region of the touch-screen unit. In another example embodiment, the facing curved sides of the touch-screen unit may correspond to convex-shape sides constituting the convex region of the touch-screen unit. In this case, when the scroll speed at the convex region of the touch-screen unit changes according to the method of FIG. 7, the scroll speed in the parallel direction to the sides become slower as it gets closer to the center part of the convex region of the touch-screen unit, and the scroll speed in the cross direction to the sides become faster as it gets closer to the center part of the convex region of the touch-screen unit.

As illustrated in FIG. 8, the scroll speed may be changed at the concave region of the touch-screen unit. Specifically, the method shown in FIG. 8 may check a direction of the touch-scroll operation at the concave region of the touch-screen unit (Step S220), and then may determine whether the direction of the touch-screen operation is a parallel direction to the sides of the touch-screen unit or a cross direction to the sides of the touch-screen unit (Step S240). Here, if the direction of the touch-screen operation is a parallel direction to the sides of the touch-screen unit, the method of FIG. 8 may increase the scroll speed of the touch-scroll operation (Step S260). On the other hand, if the direction of the touch-screen operation is the cross direction to the sides of the touch-screen unit, the method of FIG. 8 may decrease the scroll speed of the touch-scroll operation (Step S280). As illustrated in FIG. 9, the scroll speed may be changed at the convex region of the touch-screen unit. Specifically, the method shown in FIG. 9 may check a direction of the touch-scroll operation at the convex region of the touch-screen unit (Step S320), and then may determine whether the direction of the touch-screen operation is a parallel direction to the sides of the touch-screen unit or a cross direction to sides of the touch-screen unit (Step S340). Here, if the direction of the touch-screen operation is a parallel direction to the sides of the touch-screen unit, the method of FIG. 7 may decrease the scroll speed of the touch-scroll operation (Step S360). On the other hand, if the direction of the touch-screen operation is a cross direction to the sides of the touch-screen unit, the method of FIG. 9 may increase the scroll speed of the touch-scroll operation (Step S380). As described above, the method shown in FIG. 7 may provide a user with new user experiences different from comparable electronic devices that include a touch-screen unit having straight sides by changing the scroll speed (e.g., a scroll speed in a parallel direction to the sides of the touch-screen unit and the scroll speed in a cross direction to the sides of the touch-screen unit) based on the facing curved sides of the touch-screen unit when the touch-scroll operation is performed on the touch-screen unit of the electronic device.

Figure 10:
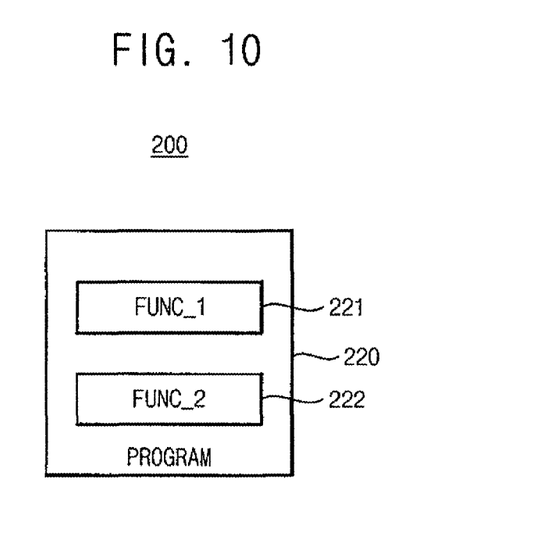
FIG. 10 is a block diagram illustrating a computer-readable medium that stores a program according to example embodiments.

FIG. 10 is a block diagram illustrating a computer-readable medium that stores a program according to example embodiments.

Referring to FIG. 10, a computer-readable medium 200 may store a program 220 that implements a function 221 for performing the touch-scroll operation on the touch-screen unit having at least one pair of facing curved sides in response to a user's input, and a function 222 for changing the scroll speed based on the facing curved sides of the touch-screen unit. As described above, the computer-readable medium 200 may provide a user with new user experiences by changing the scroll speed (e.g., a scroll speed in a parallel direction to the sides of the touch-screen unit and a scroll speed in a cross direction to the sides of the touch-screen unit) based on the facing curved sides of the touch-screen unit when a touch-scroll operation is performed on the touch-screen unit of an electronic device. Thus, when the touch-scroll operation is performed on the touch-screen unit of the electronic device, the user may experience different speed-sensations depending on respective points of the touch-screen unit of the electronic device. As a result, the computer-readable medium 200 may provide the user with speed-sensations associated the design (e.g., shape) of the touch-screen unit of the electronic device. These operations are described above, and therefore duplicated descriptions will not be repeated. Although a few example embodiments (e.g., an electronic device, a method of operating the electronic device, and a computer-readable medium that stores a program) have been described, those skilled in the art will readily appreciate that many modifications are possible in the example embodiments without materially departing from the novel teachings and advantages of the present inventive concept.

The embodiments of the present inventive concepts may be applied to any suitable electronic device (e.g., a mobile device) that includes a touch-screen unit. For example, the present inventive concepts may be applied to a cellular phone, a smart-phone, a smart-pad, a personal digital assistants (PDA), a portable multimedia player (PMP), an MP3 player, a television, a computer monitor, a laptop, a digital camera, a camcorder, a game console, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the embodiments of the present inventive concepts. Accordingly, all such modifications are intended to be included within the scope of the embodiments of the present inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims and their equivalents.

What is claimed is:

1. An electronic device comprising:
   a body unit; and
   a touch-screen unit comprising a touch-screen display device, the touch-screen unit being attached to the body unit and having at least one pair of facing curved sides, the touch-screen unit being configured to change a scroll speed in response to a touch-scroll operation performed on respective points of only the touch-screen display device of the touch-screen unit, and the scroll speed being based on the touch-scroll operation performed at the respective points relative to the at least one pair of facing curved sides, wherein the at least one pair of facing curved sides comprises concave-shaped sides, the concave-shaped sides constituting a concave region of the touch-screen unit, and wherein the scroll speed in a parallel direction to the at least one pair of facing curved sides of the touch-screen unit increases when the touch-scroll operation is performed toward a center part of the concave region of the touch-screen unit.

2. The device of claim 1, wherein the at least one pair of facing curved sides comprises a left curved side and a right curved side of the touch-screen unit.

3. The device of claim 1, wherein the at least one pair of facing curved sides comprises an upper curved side and a lower curved side of the touch-screen unit.

4. The device of claim 1, wherein the concave region of the touch-screen unit has a symmetrical shape with respect to a centerline of the touch-screen unit substantially perpendicular to the concave region.

5. The device of claim 1, wherein the concave region of the touch-screen unit has an asymmetric shape with respect to a centerline of the touch-screen unit substantially perpendicular to the concave region.

6. The device of claim 1, wherein the scroll speed in a cross direction to the at least one pair of facing curved sides of the touch-screen unit decreases when the touch-scroll operation is performed toward a center part of the concave region of the touch-screen unit.

7. An electronic device comprising:
a body unit; and
a touch-screen unit comprising a touch-screen display device, the touch-screen unit being attached to the body unit and having at least one pair of facing curved sides,
the touch-screen unit being configured to change a scroll speed in response to a touch-scroll operation performed on respective points of only the touch-screen display device of the touch-screen unit, and
the scroll speed being based on the touch-scroll operation performed at the respective points relative to the at least one pair of facing curved sides,
wherein the at least one pair of facing curved sides comprises convex-shaped sides, the convex-shaped sides constituting a convex region of the touch-screen unit
wherein the scroll speed in a parallel direction to the at least one pair of facing curved sides of the touch-screen unit decreases when the touch-scroll operation is performed toward a center part of the convex region of the touch-screen unit.

8. The device of claim 7, wherein the convex region of the touch-screen unit has a symmetrical shape with respect to a centerline of the touch-screen unit substantially perpendicular to the convex region.

9. The device of claim 7, wherein the convex region of the touch-screen unit has an asymmetric shape with respect to a centerline of the touch-screen unit substantially perpendicular to the convex region.

10. The device of claim 7, wherein the scroll speed in a cross direction to the at least one pair of facing curved sides of the touch-screen unit increases when the touch-scroll operation is performed toward the center part of the convex region of the touch-screen unit.

11. A method of operating an electronic device, the method comprising:
performing a touch-scroll operation on only a touch-screen display device of a touch-screen unit having at least one pair of facing curved sides in response to a user input; and
changing a scroll speed based on a location of the touch-scroll operation performed relative to the at least one pair of facing curved sides,
wherein the at least one pair of facing curved sides comprises a left curved side and a right curved side of the touch-screen unit, or an upper curved side and a lower curved side of the touch-screen unit,
wherein the at least one pair of facing curved sides comprises concave-shaped sides, the concave-shaped sides constituting a concave region of the touch-screen unit, and
wherein the changing the scroll speed comprises:
increasing the scroll speed in a parallel direction to the at least one pair of facing curved sides of the touch-screen unit in response to the touch-scroll operation being performed toward a center part of the concave region of the touch-screen unit; and
decreasing the scroll speed in a cross direction to the at least one pair of facing curved sides of the touch-screen unit in response to the touch-scroll operation being performed toward the center part of the concave region of the touch-screen unit.

12. A method of operating an electronic device, the method comprising:
performing a touch-scroll operation on only a touch-screen display device of a touch-screen unit having at least one pair of facing curved sides in response to a user input; and
changing a scroll speed based on a location of a touch-scroll operation performed relative to the at least one pair of facing curved sides,
wherein the at least one pair of facing curved sides comprises a left curved side and a right curved side of the touch-screen unit, or an upper curved side and a lower curved side of the touch-screen unit,
wherein the at least one pair of facing curved sides comprises convex-shaped sides, the convex-shaped sides constituting a convex region of the touch-screen unit,
wherein the changing the scroll speed includes:
decreasing the scroll speed in a parallel direction to the at least one pair of facing curved sides of the touch-screen unit in response to the touch-scroll operation being performed toward a center part of the convex region of the touch-screen unit; and
increasing the scroll speed in a cross direction to the at least one pair of facing curved sides of the touch-screen unit in response to the touch-scroll operation being performed toward the center part of the convex region of the touch-screen unit.

* * * * *